(12) United States Patent
Cordes

(10) Patent No.: US 9,789,447 B1
(45) Date of Patent: Oct. 17, 2017

(54) AERATION CABINET

(71) Applicant: Joel William Cordes, Cottage Grove, MN (US)

(72) Inventor: Joel William Cordes, Cottage Grove, MN (US)

( * ) Notice: Subject to any disclaimer, the term of this patent is extended or adjusted under 35 U.S.C. 154(b) by 0 days.

(21) Appl. No.: 15/252,483

(22) Filed: Aug. 31, 2016

(51) Int. Cl.
| F24F 7/00 | (2006.01) |
| B01F 3/04 | (2006.01) |
| C02F 1/74 | (2006.01) |
| A47B 81/00 | (2006.01) |

(52) U.S. Cl.
CPC .......... *B01F 3/04262* (2013.01); *A47B 81/00* (2013.01); *C02F 1/74* (2013.01); *B01F 2003/04368* (2013.01)

(58) Field of Classification Search
CPC ....... F24F 7/00; F24F 2007/004; A47B 81/00; B01F 3/04262; B01F 2003/04368; C02F 1/74
USPC ...................................... 261/DIG. 3, DIG. 43
See application file for complete search history.

(56) References Cited

U.S. PATENT DOCUMENTS

| 4,302,224 | A | * | 11/1981 | McCombs | ......... | B01D 53/0446 |
| | | | | | | 55/DIG. 17 |
| 4,378,982 | A | * | 4/1983 | McCombs | ......... | B01D 53/0407 |
| | | | | | | 96/117 |
| 6,490,410 | B2 | * | 12/2002 | Baribeault | .............. | F24H 3/002 |
| | | | | | | 392/371 |
| 7,179,326 | B2 | * | 2/2007 | Nakamura | ............ | A61M 16/10 |
| | | | | | | 96/128 |
| 8,844,220 | B2 | * | 9/2014 | Boersema | ............ | F24F 11/0001 |
| | | | | | | 52/198 |
| 2008/0134997 | A1 | * | 6/2008 | Ito | .............................. | F01P 5/06 |
| | | | | | | 123/41.65 |
| 2012/0014061 | A1 | * | 1/2012 | Slessman | ........... | H05K 7/20745 |
| | | | | | | 361/691 |
| 2016/0143182 | A1 | * | 5/2016 | De Felice | .......... | H05K 7/20145 |
| | | | | | | 165/248 |

FOREIGN PATENT DOCUMENTS

WO        WO 02/053912 A3 *   7/2002

* cited by examiner

*Primary Examiner* — Charles Bushey
(74) *Attorney, Agent, or Firm* — Dunlap Bennett & Ludwig PLLC

(57) ABSTRACT

An aeration cabinet is provided. The aeration cabinet secures a compressor within. The aeration cabinet includes a bottom portion operable to support the aeration cabinet in an upright position when resting on a surface. The bottom portion may include a base plate. The present invention further includes a front wall, a rear wall, a first side wall and a second side wall extending vertically from the horizontal base plate. A lid covers an opening formed along an upper edge of the front wall, the rear wall, the first side wall and the second side wall. A plurality of first vent slots are formed through the aeration cabinet where the front wall and the base plate meet. A plurality of second vent slots are formed through the aeration cabinet where the lid and the rear wall meet.

12 Claims, 6 Drawing Sheets

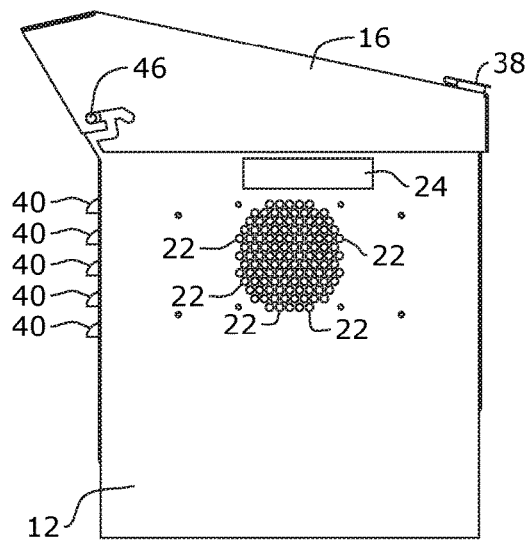
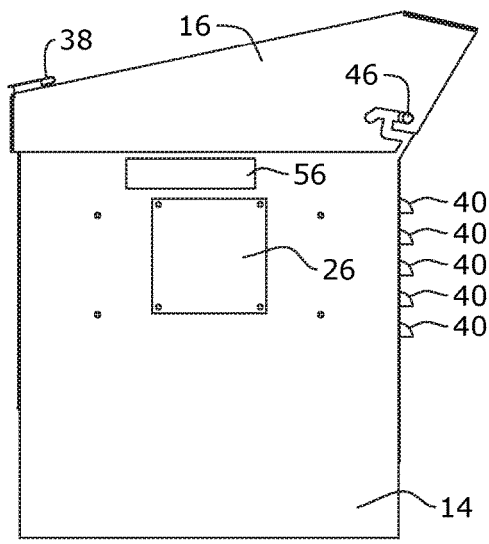
FIG.8     FIG.9
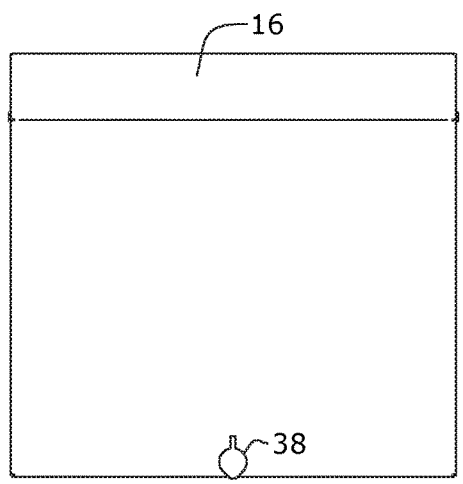
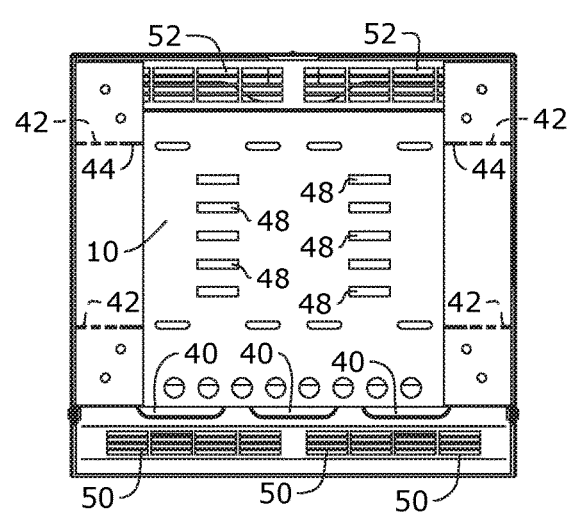
FIG.10     FIG.11

AERATION CABINET

BACKGROUND OF THE INVENTION

The present invention relates to an aeration cabinet and, more particularly, to an aeration cabinet with improved ventilation slots.

Water aeration is the process of increasing the oxygen saturation of the water. Water aeration systems may be in the form of a fountain. A fountain consists of a motor that powers a rotating impeller. The impeller pumps water from the first few feet of the water and expels it into the air. This process utilizes air-water contact to transfer oxygen. Fountains are a popular method of surface aerators because of the aesthetic appearance that they offer. Subsurface aeration seeks to release bubbles at the bottom of the water body and allow them to rise by the force of buoyancy. Diffused aeration systems utilize bubbles to aerate as well as mix the water. Currently, lake and pond aeration systems include a cabinet with an air compressor. Mechanical fans are used to cool the air compressor within the cabinet. Typically fans do not cool the compressors enough, which cause the compressors to overheat and drastically shorten the life span.

As can be seen, there is a need for an improved cooling system for air compressors.

SUMMARY OF THE INVENTION

In one aspect of the present invention, an aeration cabinet comprises: a base plate; a front wall; a rear wall; a first side wall; a second side wall; and a lid covering an opening formed along an upper edge of the front wall, the rear wall, the first side wall and the second side wall, wherein a plurality of first vent slots are formed through the aeration cabinet where the front wall and the base plate meet; and a plurality of second vent slots are formed through the aeration cabinet where the lid and the rear wall meet.

These and other features, aspects and advantages of the present invention will become better understood with reference to the following drawings, description and claims.

BRIEF DESCRIPTION OF THE DRAWINGS

FIG. 8 is a left side view of an embodiment of the present invention;

FIG. 9 is a right side view of an embodiment of the present invention;

FIG. 10 is a top view of an embodiment of the present invention;

FIG. 11 is a bottom view of an embodiment of the present invention; and

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an air compressor cabinet with strategically located slits or openings to allow natural cooling of compressor(s) inside. By utilizing convection and natural heat transfer, the lake and pond aeration system cabinet design allows cool ambient outside air to enter the cabinet through slits or louvers near the bottom front of the cabinet, flow over and across air compressor(s) housed inside the cabinet and then the heated air rises and exits through louvers or vents located at the upper rear of the cabinet lid. The use of mechanical fans is alleviated or used only as a secondary means of cooling the air compressor(s) housed inside the cabinet.

By adding strategically placed louvers or slits near the bottom of the cabinet front and then again designed into our cabinet lid in the rear, a majority of the heat generated by the compressor(s) can exit by natural convection without the use of mechanical fans. The lid or cabinet cover design also prevents snow and rain from entering with a flange or overhang above the top rear slits or louvers allowing the heat to escape while keeping rain and snow out.

Figure 1:
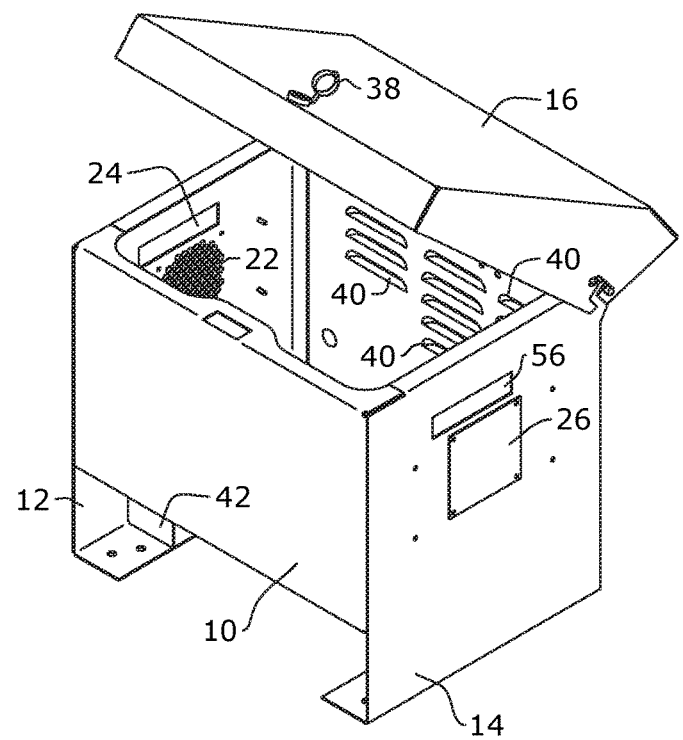
FIG. 1 is a perspective view of an embodiment of the present invention in an open position.
Figure 2:
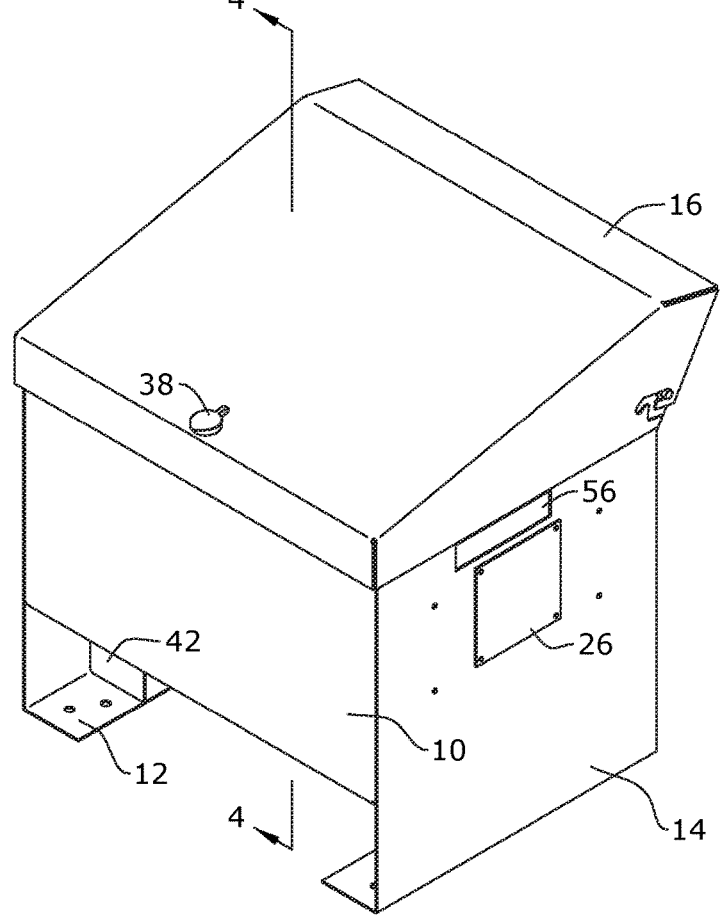
FIG. 2 is a perspective view of an embodiment of the present invention in a closed position.
Figure 3:
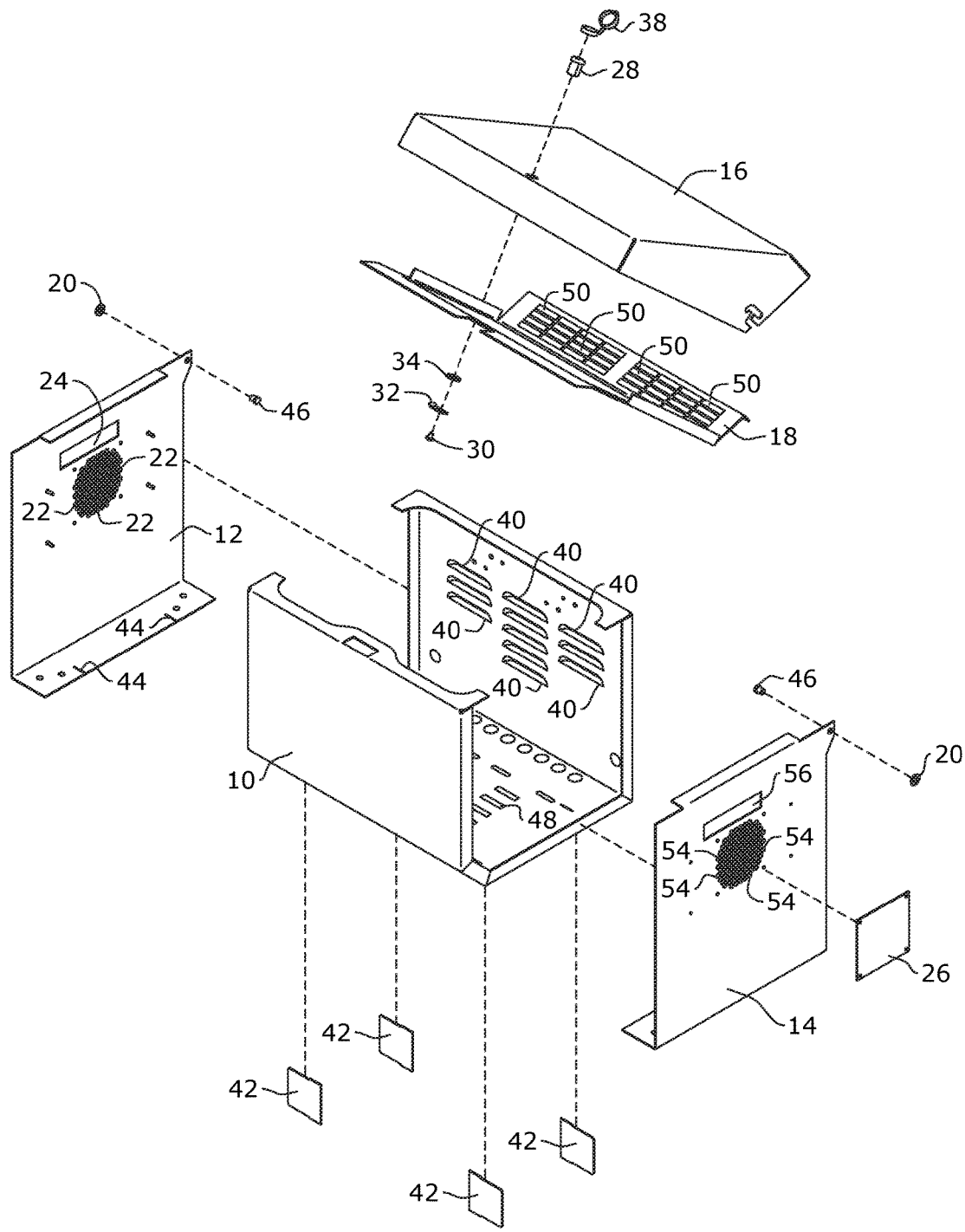
FIG. 3 is an exploded view of an embodiment of the present invention.
Figure 4:
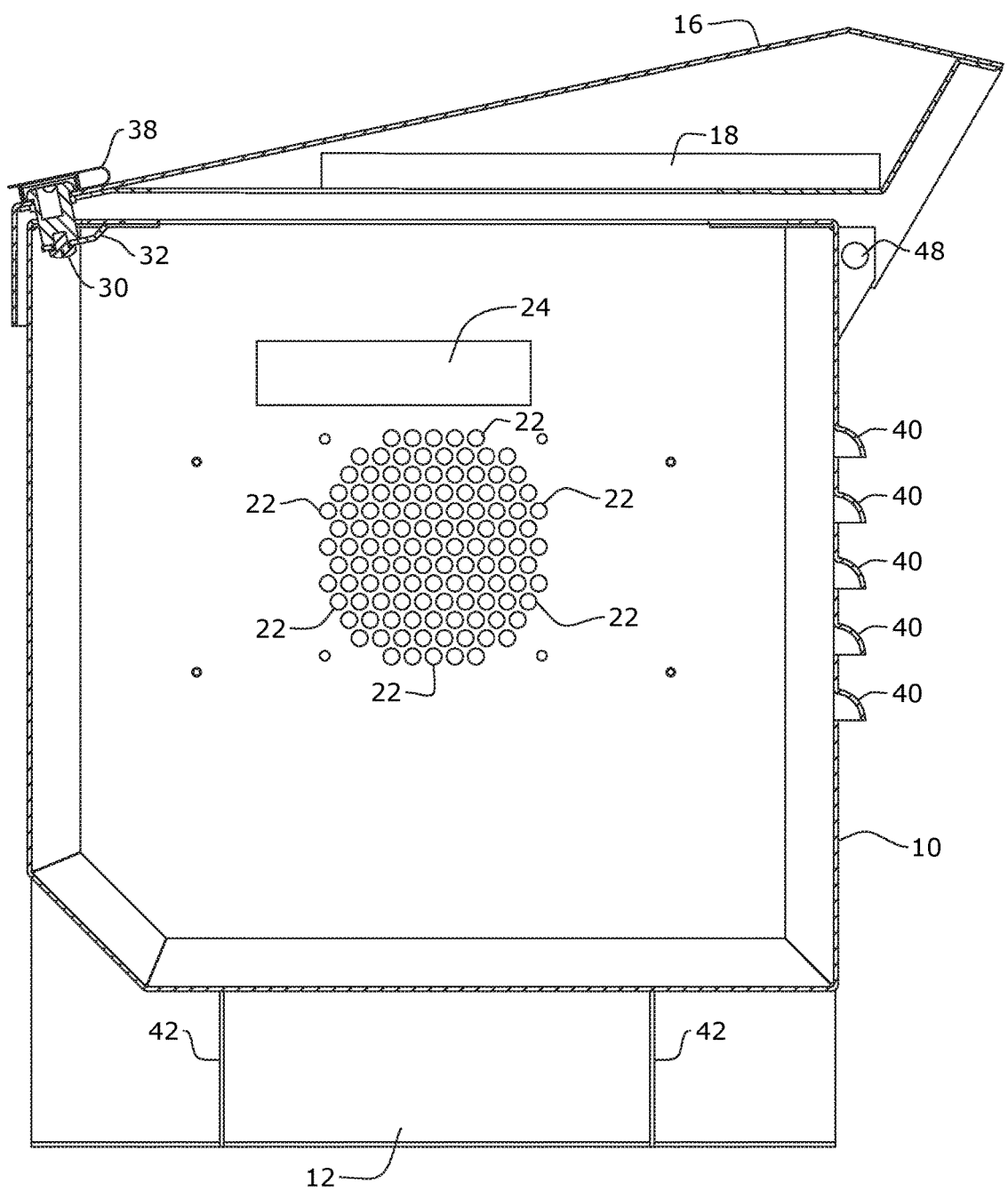
FIG. 4 is a section view of an embodiment of the present invention taken along line 4-4 in FIG. 2.
Figure 5:
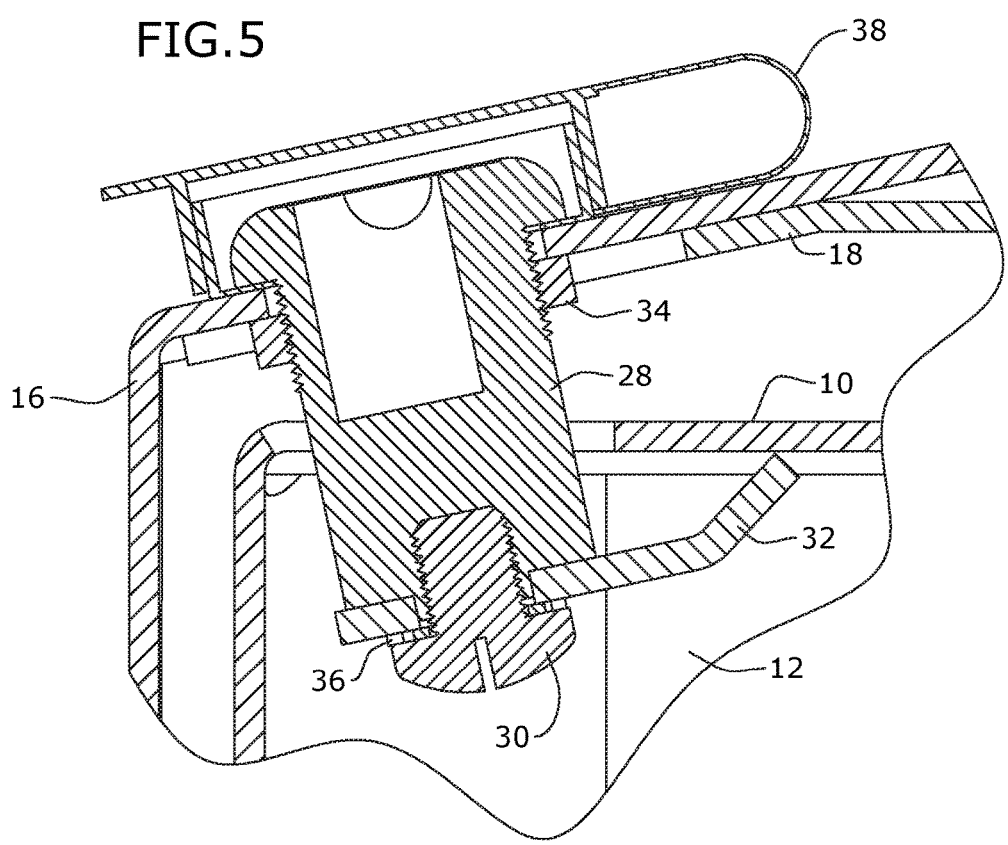
FIG. 5 is an enlarged section view of an embodiment of the locking mechanism of the present invention.
Figure 6:
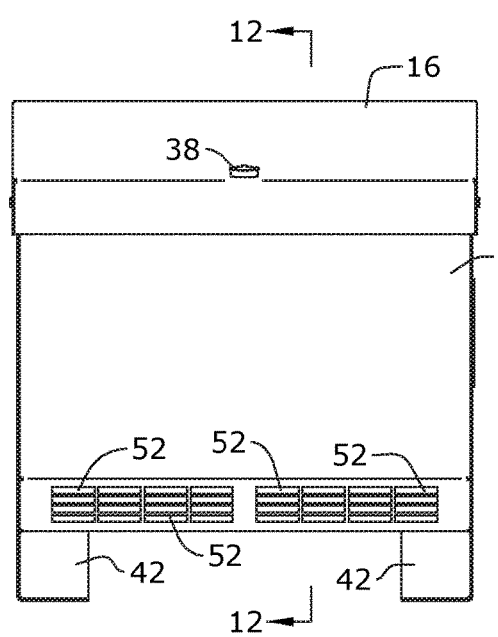
FIG. 6 is a front view of an embodiment of the present invention.
Figure 7:
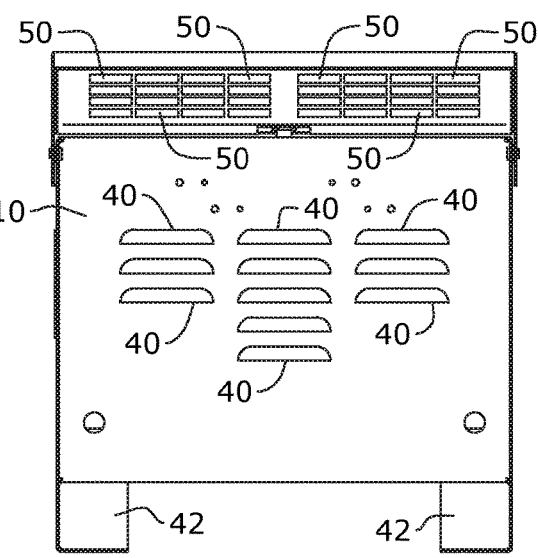
FIG. 7 is a back view of an embodiment of the present invention.
Figure 12:
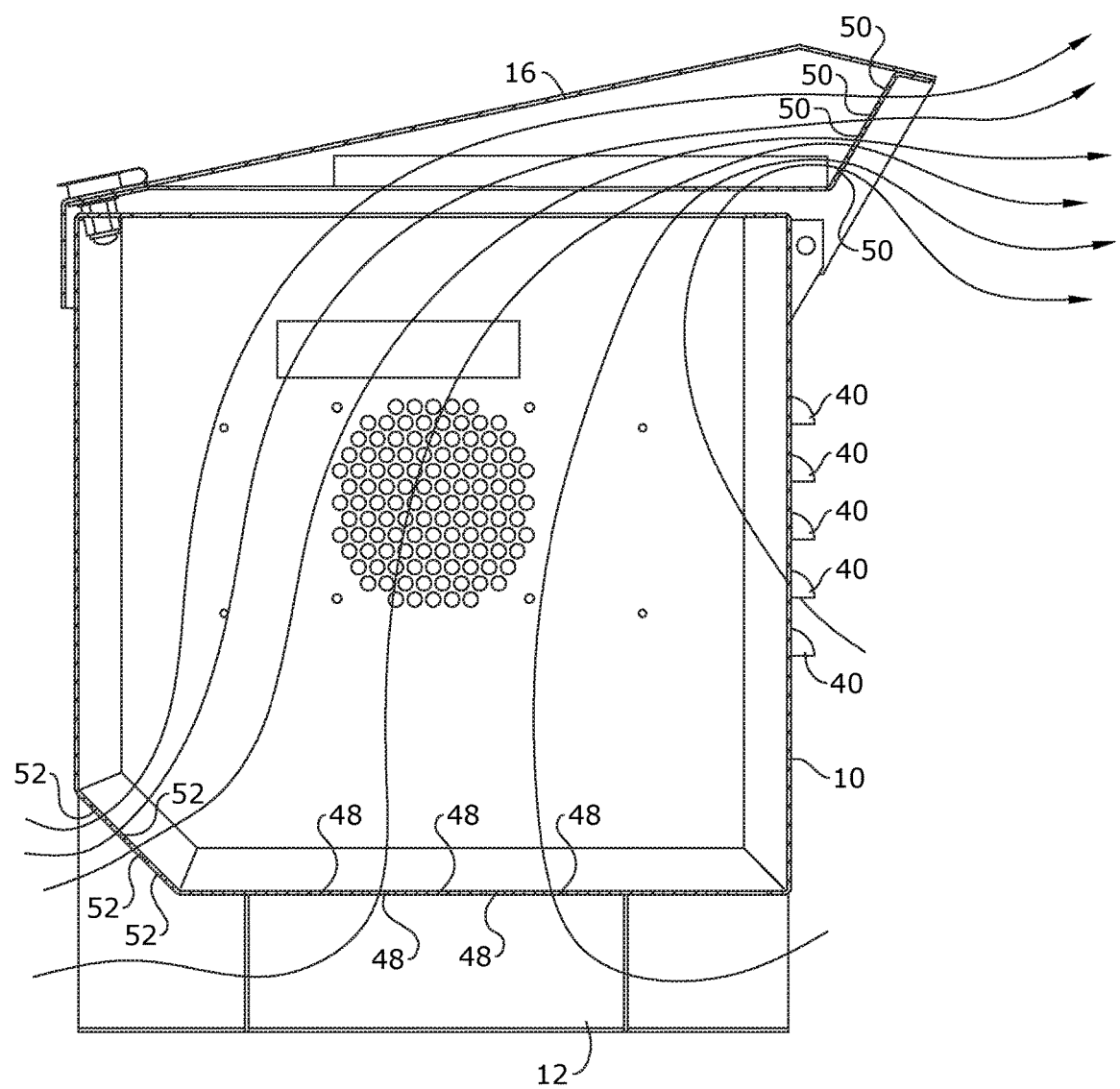
FIG. 12 is a side cutaway view of an embodiment of the present invention taken along line 12-12 in FIG. 6 illustrating the air flow.

Referring to FIGS. 1 through 11, the present invention includes an aeration cabinet 10. The aeration cabinet 10 houses a compressor within. The aeration cabinet 10 includes a bottom portion operable to support the aeration cabinet 10 in an upright position when resting on a surface. The bottom portion may include a base plate 11. The present invention further includes a front wall 13, a rear wall 15, a first side wall 12 and a second side wall 14 extending vertically from the horizontal base plate 11. A lid 16 covers an opening formed along an upper edge of the front wall 13, the rear wall 15, the first side wall 12 and the second side wall 14. A plurality of first vent slots 52 are formed through the aeration cabinet 10 where the front wall 13 and the base plate 10 meet. A plurality of second vent slots 50 are formed through the aeration cabinet 10 where the lid 16 and the rear wall 15 meet.

The bottom portion of the present invention may further include a plurality of feet 42. In such embodiments, portions of the first side wall 12 and the second side wall 14 extend below the base plate 11 and form bottom flanges. The bottom flanges include mating slots 44. The feet 42 may fit within the mating slots 44 of the flanges and slots formed through the base plate 11. The feet 42 and the portions of the first side wall 12 and the second side wall 14 elevate the base plate above the surface when resting on the surface. In certain embodiments, the bottom portion may further include a beveled surface adjoining the front wall 13 and the base plate 11. The plurality of first vent slots 52 may be formed through the beveled surface.

In certain embodiments, a rear portion of the lid 16 is pivotally secured to the rear wall 15 by a pair of dowels 46 and a pair of washers 20. Further, the present invention may include an inner lid 18 disposed between the lid 16 and the upper edge. The inner lid 18 may include a rear surface angled away from the base plate 11 and disposed adjacent the rear wall 15. The plurality of second vent slots 50 may be formed through the rear surface. In certain embodiments, a rear portion of the lid 16 extends over and thereby covers the rear surface of the inner lid 18. Therefore, the rear portion of the lid 16 may prevent snow and rain from entering the aeration cabinet 10 through the second vent slots 50.

The present invention may further utilize a locking mechanism. The lid 16, the inner lid 18 and a flange formed at the upper edge of the front wall 13 may include aligning apertures. A locking shaft 28 runs through the aligning apertures with a top end extending through the aperture of the lid 16 and the bottom end extending through the aperture of the front wall 13. A lock cover 38 is secured to a top end of the locking shaft 28. The lock cover 38 has a larger diameter than the aperture formed through the lid 16. A latch 32 is secured to the bottom end of the locking shaft 28 by a nut 34 and a screw 30. The latch 32 includes larger dimensions than the aperture of the front wall 13, thereby locking the lid 16 to the upper edge.

The aeration cabinet 10 may include a plurality of other vents and slots to aid in cooling the compressor. For example, the present invention may include a plurality of fan vent apertures 22 formed through the first side wall and a plurality of fan vent apertures 54 formed through the second side wall. A fan may be attached to cover the fan vent apertures 22, 54 if desired. A vent cover 26 may be attached to cover the vent apertures 22, 54 when not in use. The present invention may further include a plurality of grates 40 formed through the rear wall 15 and a plurality of base vent apertures 48 formed through the base plate 11. A first handle aperture 24 may be formed through the first side wall 12 and a second handle aperture 56 may be formed through the second side wall 14. The first and second handle apertures 24, 56 are sized to receive a hand and are used for carrying the aeration cabinet 10.

The vent slots of the aeration cabinet are placed or manufactured into the design at the appropriate locations and may be the same size dimensionally. The present invention allows equal air distribution and flow from the lower front to the upper rear of the cabinet. The present invention could be made from a variety of materials, such as aluminum or steel. The present invention could be of varying sizes and/or shapes as long as the aforementioned considerations are met. By installing electric motor air compressor(s) within the aeration cabinet base an effective means of lake and pond aeration can be produced with longevity and efficient operation of the compressors for extended periods of time.

It should be understood, of course, that the foregoing relates to exemplary embodiments of the invention and that modifications may be made without departing from the spirit and scope of the invention as set forth in the following claims.

What is claimed is:

1. An aeration cabinet comprising:
    a base plate;
    a front wall;
    a rear wall;
    a first side wall;
    a second side wall;
    a lid covering an opening formed in between an upper edge of the front wall, the rear wall, the first side wall and the second side wall; and
    a rear surface disposed between the lid and the upper edge adjacent to the rear wall, wherein the rear surface is angled away from the front wall and away from the base plate, wherein
    a plurality of first vent slots are formed through the aeration cabinet where the front wall and the base plate meet, and
    a plurality of second vent slots are formed through the rear surface.

2. The aeration cabinet of claim 1, further comprising a beveled surface adjoining the front wall and the base plate, wherein the plurality of first vent slots are formed through the beveled surface.

3. The aeration cabinet of claim 1, further comprising an inner lid disposed between the lid and the upper edge, wherein the inner lid comprises the rear surface.

4. The aeration cabinet of claim 1, wherein a rear portion of the lid covers the rear surface.

5. The aeration cabinet of claim 3, further comprising a locking mechanism comprising:
    a locking shaft disposed through aligning apertures formed through the front wall and the lid;
    a lock cover secured to a top end of the locking shaft; and
    a latch secured to a bottom end of the locking shaft.

6. The aeration cabinet of claim 1, wherein a plurality of fan vent apertures are formed through each of the first side wall and the second side wall.

7. The aeration cabinet of claim 1, further comprising a plurality of grates formed through the rear wall.

8. The aeration cabinet of claim 1, wherein a plurality of base vent apertures are formed through the base plate.

9. The aeration cabinet of claim 1, wherein a rear portion of the lid is pivotally secured to the rear wall by a pair of dowels.

10. The aeration cabinet of claim 1, further comprising a plurality of feet secured to a bottom portion of the base plate and operable to elevate the base plate above the surface when resting on the surface.

11. An aeration cabinet comprising:
    a base plate;
    a front wall;
    a rear wall;
    a first side wall;
    a second side wall;
    a lid covering an opening formed in between an upper edge of the front wall, the rear wall, the first side wall and the second side wall; and
    an inner lid disposed between the lid and the upper edge, wherein the inner lid comprises a rear surface angled away from the base plate and disposed adjacent the rear wall, wherein
    a plurality of first vent slots are formed through the aeration cabinet where the front wall and the base plate meet, and
    a plurality of second vent slots are formed through the rear surface.

12. An aeration cabinet comprising:
    a base plate;
    a front wall;
    a rear wall;
    a first side wall;
    a second side wall; and
    a lid covering an opening formed in between an upper edge of the front wall, the rear wall, the first side wall and the second side wall; wherein
    a rear portion of the lid is pivotally secured to the rear wall by a pair of dowels;

a plurality of first vent slots are formed through the aeration cabinet where the front wall and the base plate meet, and a plurality of second vent slots are formed through the aeration cabinet where the lid and the rear wall meet.

\* \* \* \* \*